Aug. 5, 1969 P. J. VENEZIANO 3,460,109

AUTOMATIC TESTER FOR EVALUATING COMPUTER MEMORY SYSTEMS

Filed Sept. 2, 1965 5 Sheets-Sheet 1

INVENTOR
PHILIP J. VENEZIANO
BY John B. Ardone
ATTORNEY 3,460,109

AUTOMATIC TESTER FOR EVALUATING COMPUTER MEMORY SYSTEMS

Philip J. Veneziano, Wappinger Falls, N.Y., assignor to International Business Machines Corporation, New York, N.Y., a corporation of New York Filed Sept. 2, 1965, Ser. No. 484,585
Int. Cl. G06f *11/04*; G01r *33/00*
U.S. Cl. 340—174 13 Claims

ABSTRACT OF THE DISCLOSURE

An automatic tester for evaluating computer memory systems cycles test data through each of the memory addresses and compares the supplied data with the read data for providing an error signal when they fail to compare. Coincident operating currents for the memory are varied simultaneously but differently and a recorder, responsive to the automatically varying currents and the error signals, graphically displays the error free area of operation by a series of partial Lissajous curves.

This invention relates to testers for evaluating the performance of a computer memory system under a wide range of operating parameters and more particularly to the automatic testing of coincident current memory systems.

Magnetic core memories as well as memories utilizing other storage media of the coincident current type are subject to noise problems. In the magnetic core memories, the noise is in part the result of departures of the hysteresis loops of the cores from rectangularity. These departures, while small, are significant and tend to vary from one sample to another, thus, preventing the use of a single set of operating parameters for individual memories of a given type.

It is therefore necessary to test each memory unit after fabrication to determine the error free operating range of the drive voltages, to thus optimize the operation of the sample being tested. The memory is usually tested under four different storage conditions for ranges of drive voltages and a plot made of the error free boundary. The boundary of error free operation is known as a Schmoo Plot due to its characteristic shape.

A complete test must be run for each of the four storage conditions so that the optimum operating point may be selected by comparing the error free boundaries of each of the four plots. The four storage conditions generally used are: all ONE'S, all ZERO'S, worst-case and worst-case complement. However, for any given memory this may be varied. Furthermore, less than four or more than four plots may be utilized. The particular storage configuration utilized and the number of plots made is immaterial insofar as the subject invention is concerned and has no material bearing thereon.

The Schmoo Plot is manually generated by setting the X/Y driver power supply and Z driver power supply, in the case of a 3D memory, to some nominal value. Thereafter, the Z power supply voltage is held constant while the X/Y power supply voltage is incrementally increased. At each incremental value a complete memory cycle, i.e. each address in memory is put through a read/write cycle, is completed and a check made for errors. As soon as an error is detected the operating points, i.e. the X/Y driver power supply voltage vs the Z driver power supply voltage is plotted. The nominal X/Y driver power supply voltage is thereafter incrementally decreased to determine the lower error free limit for the nominal Z driver power supply voltage. The Z driver power supply voltage is then incremented and the above steps repeated until the error free boundary for the storage condition is established.

From the above description it is quite apparent that this mode of testing is an arduous and time consuming procedure.

It is therefore one object of this invention to provide an automatic tester for computer memories.

Another object of the invention is to provide an automatic computer memory tester which is both accurate and reliable in operation.

A further object of the invention is to provide a tester of the type set forth above which attains a significant improvement in the speed with which a memory may be tested over the manual method.

Yet another object of the invention is to provide a memory tester which is versatile and capable of providing varying degrees of accuracy as selected by the operator.

A further object of the invention is to provide a novel method for testing computer memories which is fast, accurate and reliable.

The invention contemplates an automatic tester for evaluating computer memory systems comprising means for providing the test memory with storage data, means for cycling the data through each of the memory addresses, means for comparing the supplied data and the read data and for providing an error signal when they fail to compare, means for automatically varying the memory drive currents, and recording means responsive to the means for automatically varying the drive currents and error signals from the comparator for graphically displaying the boundary of the error free area of operation of the test memory.

The foregoing and other objects, features and advantages of the invention will be apparent from the following more particular description of a preferred embodiment of the invention as illustrated in the accompanying drawings.

Figure 1:
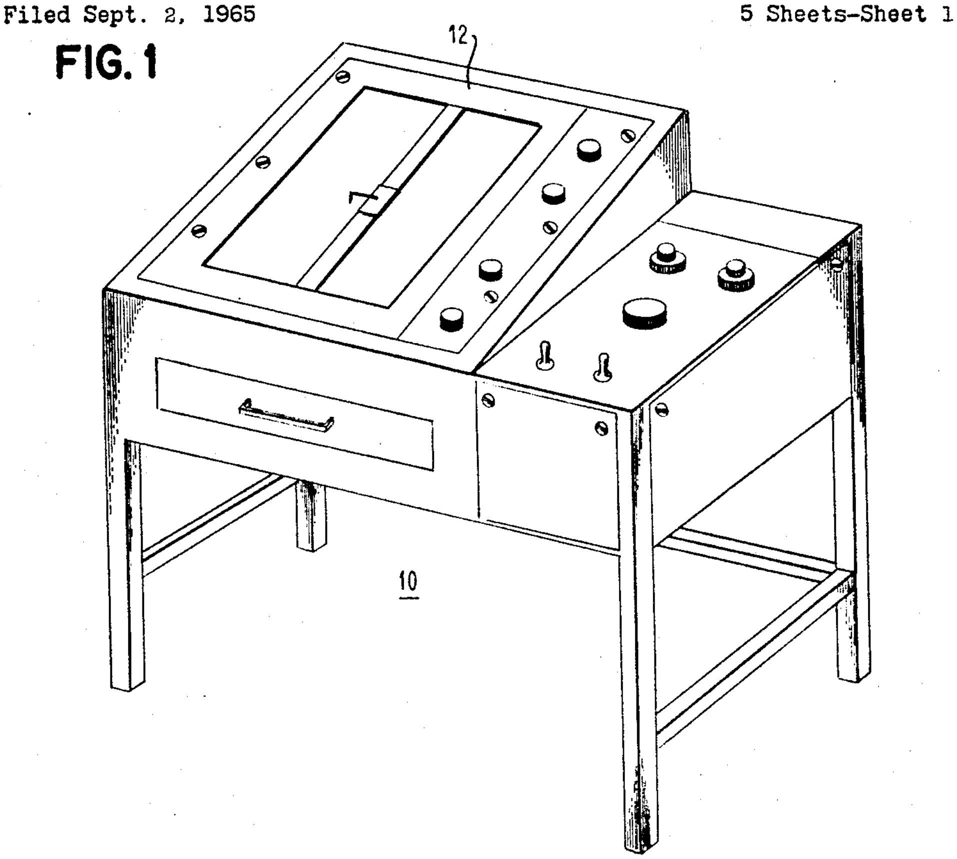
FIGURE 1 is a perspective view of an automatic memory tester constructed according to the invention.

The automatic memory tester is contained within a console 10 shown in FIGURE 1 and includes a conventional (X/Y) pen plotter 12 and associated controls mounted on an inclined upper surface where it is readily available to the operator for insertion and removal of the paper on which the Schmoo Plot is made. The remaining controls which will be described in greater detail are located on a horizontal panel adjacent the inclined upper surface which mounts the (X/Y) pen recorder 12.

Figure 2:
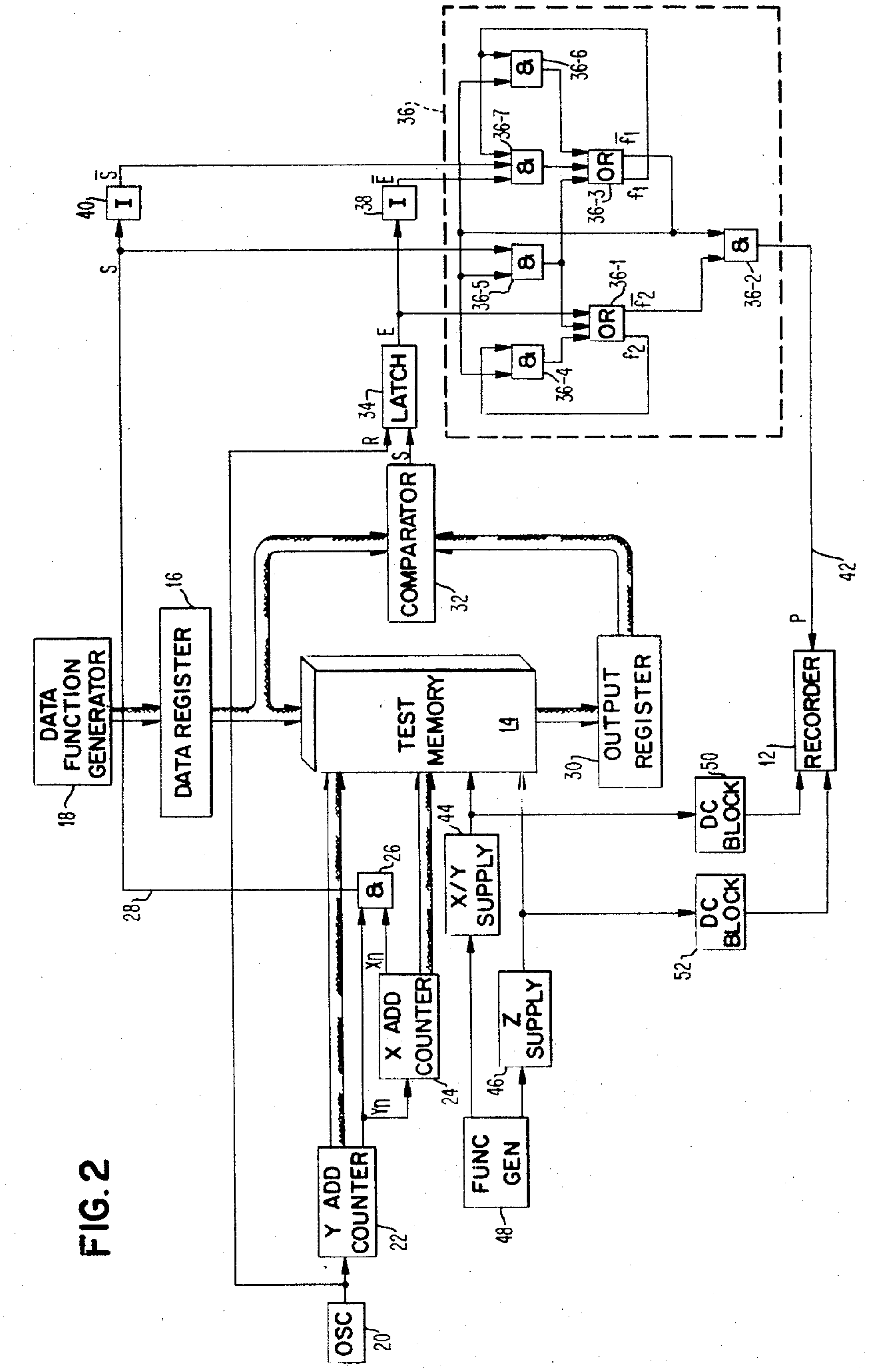
FIGURE 2 is a block diagram of the novel tester.

In FIGURE 2 the test memory 14 is connected via a data register 16 to a data function generator 18 and as previously set forth various storage conditions may be provided by the generator 18. That is, the generator may supply all ONE'S, all ZERO'S, worst-case and worst-case complement or alternatively any other storage condition which the operator might select to properly exercise the memory under test. The particular data supplied to data register 16 will in most instances be limited to the four cases set forth above, however, certain memories will require additional or different storage conditions to accurately determine the error free boundary. The particular information format used to test a given memory will not, however, influence the operation of the tester since it provides a plot of the error free boundary regardless of the information content.

An oscillator 20 steps a Y address counter 22 which controls the gating of the Y drivers. An X address counter 24 is stepped by *n*th Y pulse and controls the gating of the X drivers. Thus, all Y addresses are read for each X address and the same is repeated for each succeeding X address. The *n*th X and Y outputs are connected to an AND gate 26 which provides an output S on a conductor 28 indicating the termination of a complete memory cycle, i.e. a read/write cycle for each address in memory.

The sense amplifiers of memory 14 are connected to an output data register 30 which is connected to a comparator circuit 32 which compares the information processed by the memory 14 with the original data input from register 16. When a deviation or error is detected, comparator 32 sets a latch 34 to generate an error signal E. Latch 34 is reset by oscillator 20. The signals E and S are applied to a logic circuit 36 and inverters 38 and 40 apply the negations thereof, respectively, to the logic circuit 36.

Logic circuit 36 provides an output P on a conductor 42 whenever an error signal E occurs. The P signal remains up until one complete error free memory cycle occurs. Both the utilization of the P signal and the operation of logic circuit 36 will be described later.

The X/Y driver power supply 44 and Z driver or inhibit driver power supply 46 of test memory 14 are shown separately to facilitate understanding. Each is connected to a function generator 48 which supplies two alternating voltages, one to each power supply. The two voltages differ slightly in frequency and are of opposite phase periodically. The voltage variation thus applied results in a cyclic variation of the memory drive currents.

The alternating component of power supply 44 is passed through a direct current blocking circuit 50 and applied to the (X) input of pen recorder 12 while the alternating component of power supply 46 is passed through a similar direct current blocking circuit 52 and applied to the (Y) input of recorder 12. With this arrangement the location of the pen of recorder 12 is an analogue of the operating point of memory 14. The (P) output of logic circuit 36 on conductor 42 is applied to the pen control circuit of recorder 12 and lowers the pen onto the paper when the error latch 34 is set. The pen remains lowered and writes until one complete error free memory cycle is completed.

Figure 5:
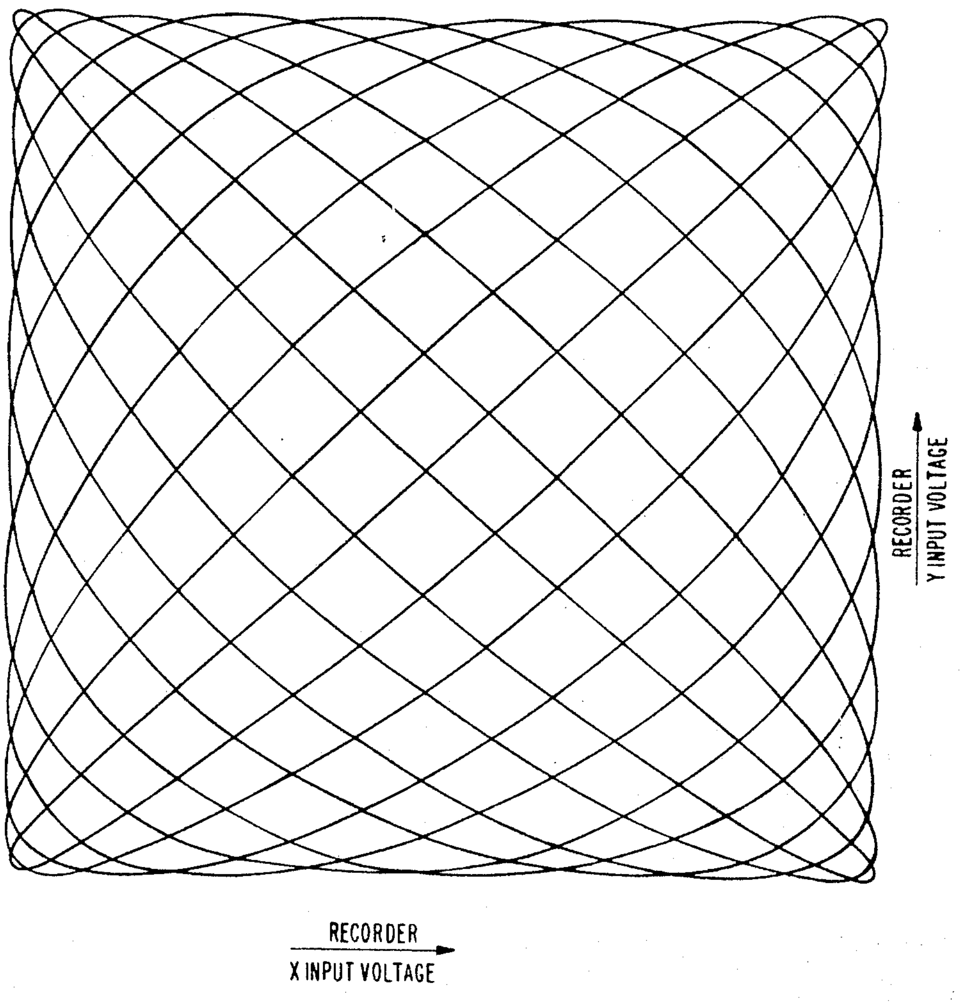
FIGURE 5 is a graphical illustration of a typical pattern traced by the recorder shown in FIGURES 1 and 2; and, FIGURE 6 is a typical Schmoo Plot of a memory tested by the novel automatic memory tester illustrated in FIGURES 1–4, inclusive.
Figure 6:
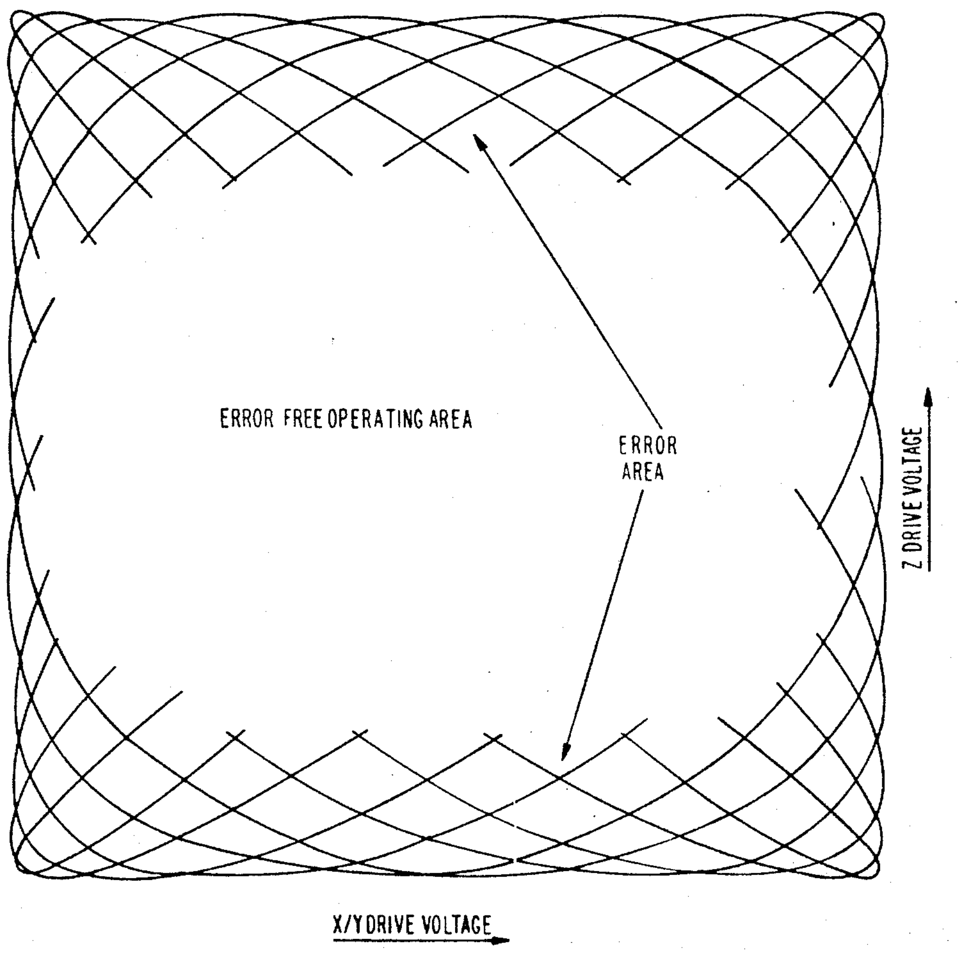

FIGURE 5 illustrates the path traversed by the pen of recorder 12. This path is the direct result of the two alternating voltages applied to the (X) and (Y) recorder inputs. FIGURE 6 shows a typical Schmoo Plot of a memory under test. The blank area in the central portion is the error free operating area and the exterior portions with the pattern lines represents the error area since the pen is lowered in this area by the (P) signal on conductor 42. With the use of a number of similar plots made under the storage conditions described above an area of error free operation, under all conditions, may be determined and the nominal operating points for the test memory set forth. The thus selected nominal operating points will apply to the test memory until such time as conditions change. However, because the cores themselves represent the greatest cause for deviation between samples, significant changes are unlikely since the core characteristics are comparatively static and do not change materially with time. The usual practice is to record the nominal operating points and the maximum permissible variation on the name plate or other conspicuous location, so that the power supplies may be properly adjusted or checked during routine or other types of service.

The output P provided by logic circuit 36 on conductor 42 may assume one of two states. In the first state the pen is held in the up position out of contact with the paper to indicate error free operation. In the second state the pen is moved into contact with the paper and deposits ink thereon to indicate an operational error. Once moved into contact it must remain in this position until one complete error free memory cycle has elapsed.

When an error is detected by circuit 32, latch 34 is set and the E output switches the output of an OR gate 36–1 from $\bar{f}_2$ to $f_2$. This causes the output of an AND gate 36–2 to switch from a first to a second state thus causing the pen to descend into contact with the paper to indicate an operational error.

The output $f_2$ and the output $\bar{f}_1$ from an OR gate 36–3 latch the output of OR gate 36–1 at $f_2$ via an AND gate 36–4. Subsequent error signals E during the current memory cycle cause no change in this condition and the logic circuit remains static until the next S signal, which indicates the completion of the current memory cycle. Upon the occurrence of the S signal OR gate 36–3 is switched from $\bar{f}_1$ to $f_1$ via an AND gate 36–5 condfitioned by $f_2$ and triggered by S. The output of OR gate 36–3 is held on $f_1$ temporarily by $f_2$ and $f_1$ via an AND gate 36–6 while S transits to $\bar{S}$ and thereafter by $\bar{E}$. $\bar{S}$. $f_1$ via an AND gate 36–7.

If a complete error free memory cycle occurs the next S signal will not pass gate 36–5 and gate 36–7 will drop in output causing the latch on OR gate 36–3 to release and both $\bar{f}_1$ and $\bar{f}_2$ will be up restoring the output of gate 36–2 to the first condition at which time the pen will raise to indicate error free memory operation.

If on the other hand an error had occurred during the succeeding memory cycle gate 36–3 would switch from $f_1$ to $\bar{f}_1$ and gate 36–1 would switch to $f_2$ as previously described and the circuit would revert to the condition previously described. This circuit fulfills the requirements since the pen is lowered as soon as the latch 34 is set to indicate error and is raised only after at least one complete error free memory cycle.

Figure 4:
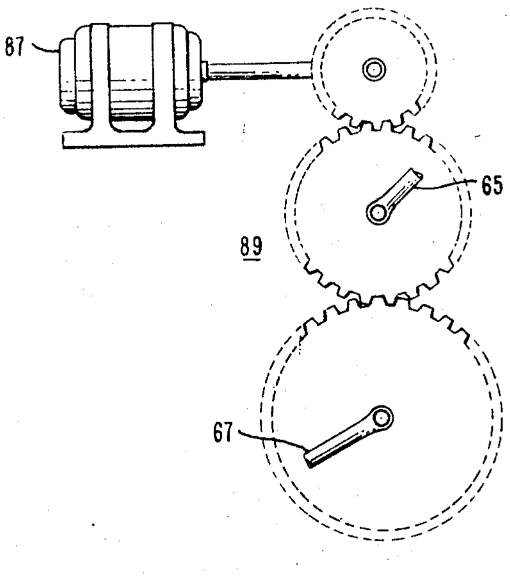
FIGURE 4 is a plan view of a mechanical drive system suitable for use with the circuit illustrated in FIGURE 3.
Figure 3:
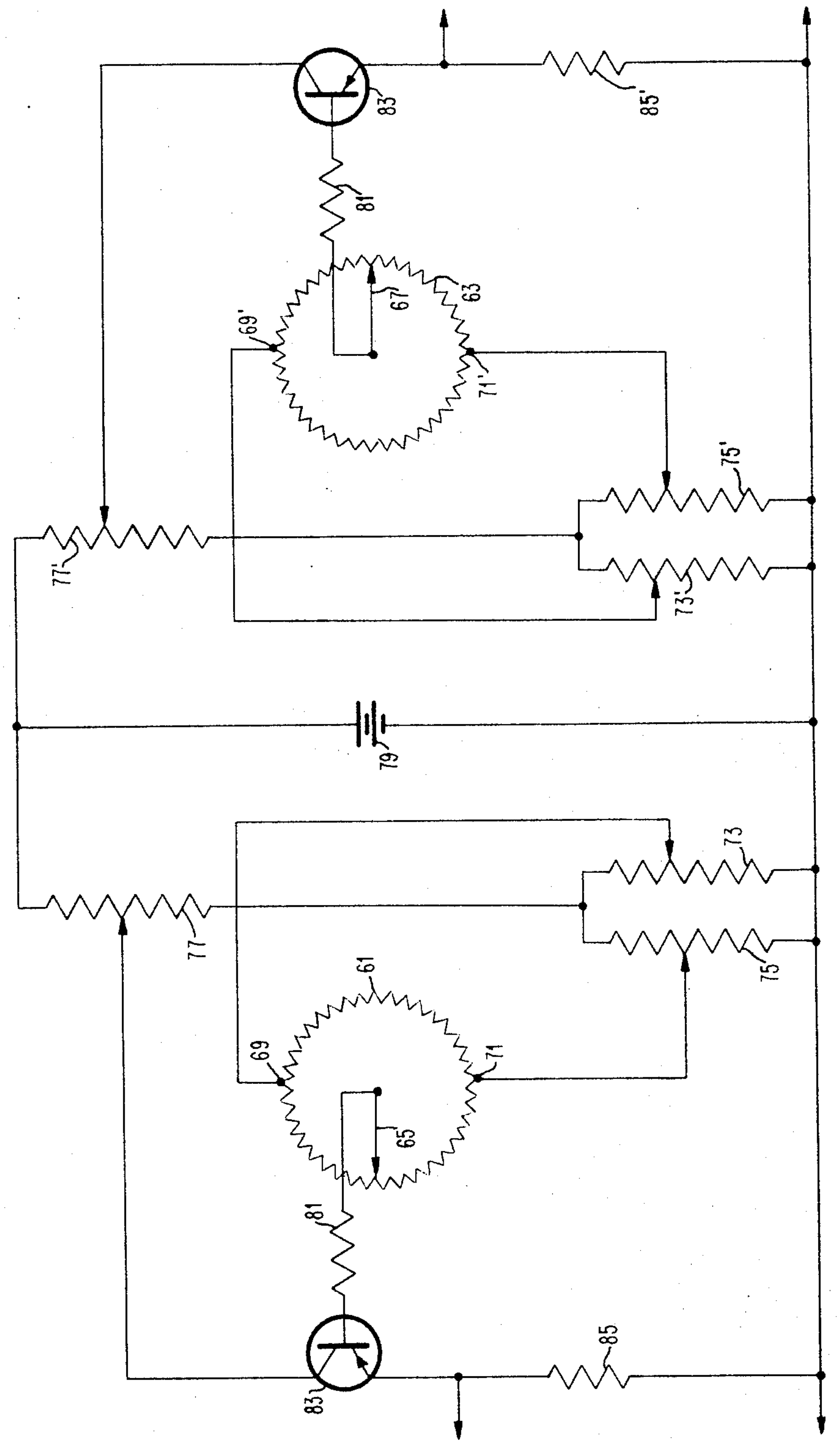
FIGURE 3 is a schematic diagram of a portion of the circuit shown in block form in FIGURE 2.

The details of the function generator 48, shown in block form in FIGURE 2, are disclosed in FIGURES 3 and 4. Two sine potentiometers 61 and 63 having rotatable wipers 65 and 67, respectively, provide the alternating components previously set forth. Potentiometer 61 has two terminals 69 and 71 connected to the wipers of two linear potentiometers 73 and 75, respectively. Potentiometers 73 and 75 are connected in parallel with each other and in series with a potentiometer 77 and a battery or other direct current source 79. The potentiometers 73 and 75 set the upper and lower voltage swing of the alternating voltage supplied at wiper 65. They may be mechanically intercoupled so that their functions will not be reversed, otherwise care must be exercised in setting the potentiometers so that the relative polarity of voltages applied to terminals 69 and 71 does not reverse.

Wiper 65 is connected via a resistor 81 to the base of an emitter follower transistor 83 and the alternating output voltage is derived across an emitter resistor 85. The collector of transistor 83 is connected to the wiper of potentiometer 77 and is thus provided with an adjustable bias.

The circuit for deriving the second voltage is similar in both construction and operation and the components cooperating with potentiometers 63 have been given the same reference numerals primed as used for those components associated with potentiometer 61. Wipers 65 and 67 are initially set 180° out of phase in order to achieve the best pattern coverage, thus, one potentiometer provides a sine function while the other the co-sine function. This initial phase relationship may, however, be varied to secure additional patterns which under certain test conditions may prove more advantageous.

Wipers 65 and 67 are driven at different speeds by a motor 87, shown in FIGURE 4 through a gear drive 89. Thus, a slight frequency difference is achieved. The difference as well as the frequency may be varied by changing the ratios of the gears to suit a given set of circumstances.

While an automatic pen recorder has been illustrated for recording the Schmoo Plot, the function may be carried out by other means. A long persistance cathode-ray tube employing vertical and horizontal deflection circuits and beam intensity control may be employed. Furthermore, the particular novel method of testing disclosed may also be implemented manually. Such a manual system, however, will lack the speed of the automatic system disclosed.

While the invention has been particularly shown and described with reference to a preferred embodiment thereof, it will be understood by those skilled in the art that various changes in form and detail may be made therein without departing from the spirit and scope of the invention.

What is claimed is:

1. An automatic computer memory tester comprising,
means for providing the memory to be tested with predetermined data for storage,
means for writing and reading said data into and out of each addressable location in the memory under test,
means for comparing the data supplied to the test memory and the data read out of the test memory and for providing error signals whenever the data fails to correspond,
means for simultaneously but differently varying coincident drive currents of the test memory, and
recording means responsive to the drive current variations and the error signals from the comparator for recording the boundary of the error free area of operation of the test memory.

2. An automatic computer memory tester as set forth in claim 1 in which the drive current variations constitute at least two sinusoidal variations of different frequency.

3. An automatic computer memory tester comprising,
means for providing the memory to be tested with predetermined data for storage,
means for writing and reading said data into and out of each addressable location in said memory to be tested,
means for comparing the data supplied to the test memory and the data read out of the test memory and for providing error signals whenever the data fails to correspond,
means for automatically and simultaneously varying the inhibit, the X and the Y drive currents of the memory under test, and
recording means responsive to the means for automatically varying the memory drive currents and the error signal from the comparator for graphically displaying the boundary of the error face area of operation of the memory under test.

4. An automatic computer memory tester comprising,
means for providing the memory to be tested with predetermined storage data,
means for writing and reading said data into and out of each addressable location in the test memory,
means for comparing the data supplied to the test memory and the data read out of the test memory for providing error signals whenever the data compared fails to correspond,
means for simultaneously and continuously varying the inhibit, X and Y drive currents of the test memory, and
recording means responsive to the means for continuously varying the test memory drive currents and the error signals from the comparator for graphically displaying the boundary of the error free area of operation of the memory under test.

5. An automatic computer memory tester as set forth in claim 4 in which said inhibit, X and Y drive currents are sinusoidally varied and the sinusoidal variations are of at least two different frequencies.

6. An automatic computer memory tester as set forth in claim 5 in which said sinusoidal variations periodically attain their respective maximum and minimum values simultaneously.

7. A method for testing a computer memory comprising the steps of,
storing predetermined data in each addressable location of the memory,
continuously varying the memory drive currents over a predetermined limit,
reading the stored data and comparing it with the actual data stored to detect error conditions, and
plotting the intersections of the instantaneous values of at least two of the continuously varying memory drive currents upon the occurrence of an error condition and until such time as the test memory completes a full cycle of operation without an error.

8. A method for testing computer memory having a common X and Y driver power supply and separate inhibit driver power supply comprising the steps of,
storing predetermined data in each addressable location in the memory,
continuously varying the voltage of the X and Y driver power supply about a nominal value,
and at the same time continuously varying the voltage of the inhibit driver power supply about a nominal value,
reading the stored data and comparing it with the actual data stored to detect error conditions, and
plotting the intersection of the instantaneous voltages of the X and Y driver power supply and the inhibit driver power supply upon the occurrence of an error condition and until such time as the test memory completes a full error free cycle of operation.

9. A method for testing a computer memory as set forth in claim 8 in which said X and Y driver power supply has a first sinusoidal voltage of a first predetermined frequency impressed thereon and said inhibit driver power supply has a second sinusoidal voltage of a second predetermined frequency impressed thereon.

10. The method set forth in claim 9 in which said first and second sinusoidal voltages periodically attain their respective maximum and minimum voltages simultaneously.

11. An automatic computer memory tester comprising,
means for providing the memory to be tested with predetermined storage data,
means for writing and reading said data into and out of each addressable location in the test memory,
means for comparing the data supplied to the test memory and the data readout of the test memory and providing an error signal whenever the compared data fails to correspond,
first and second sine potentiometers each having a rotatable wiper and a pair of terminals at 0° and 180°,
a direct current voltage source connected across the potentiometer terminals,
means for rotating the wipers of the first and second sine potentiometers at different speeds concurrently,
means for applying the sinusoidal voltage appearing at the wiper of the first potentiometer to one of the driver power supplies of the test memory whereby a sinusoidal variation is impressed on the drive current derived from that power supply,
means for applying the sinusoidal voltage appearing at the wiper of the second potentiometer to a second driver power supply of the test memory whereby a sinusoidal variation is impressed on the drive current derived from that power supply,
logical circuit means responsive to the error signal from the comparing means and the means for writing and reading said data into and out of the memory for providing a latch set by said error signal which remains set until one complete error free memory cycle has been completed, and
Lissajous curve recording means responsive to the simultaneous sinusoidal voltages applied to the test memory power supplies and to the latched error output of the logical circuit means for graphically displaying the boundary of the error free area of operation of the memory under test.

12. An automatic computer memory tester comprising, means for continuously differentially varying the drive currents of the test memory from nominal levels, means testing for the occurrence of errors upon the transfer of data to or from the test memory, and recording means responsive to the variations of the drive currents and the error testing means for recording the boundary of the error free area of operation of the test memory.

13. An automatic computer memory tester as set forth in claim 12 in which the drive current variations constitute at least two sinusoidal variations of different frequencies.

References Cited

UNITED STATES PATENTS

| | | | |
|---|---|---|---|
| 3,027,542 | 3/1962 | Silva | 340—146.1 |
| 3,049,692 | 8/1962 | Hunt | 340—174 XR |
| 3,122,724 | 2/1964 | Felton et al. | 340—174 |
| 3,252,097 | 5/1966 | Homan | 340—146.1 XR |

BERNARD KONICK, Primary Examiner

G. M. HOFFMAN, Assistant Examiner

U.S. Cl. X.R.

324—34